US012106954B2

(12) United States Patent
Lin et al.

(10) Patent No.: US 12,106,954 B2

(45) Date of Patent: Oct. 1, 2024

(54) DIELECTRIC BARRIER DISCHARGE IONIZATION, ANALYTICAL INSTRUMENT AND IONIZATION METHOD

(71) Applicant: SHIMADZU CORPORATION, Kyoto (JP)

(72) Inventors: Yiming Lin, Shanghai (CN); Wenjian Sun, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 860 days.

(21) Appl. No.: 17/277,999

(22) PCT Filed: Oct. 17, 2019

(86) PCT No.: PCT/JP2019/040900

§ 371 (c)(1),
(2) Date: Mar. 19, 2021

(87) PCT Pub. No.: WO2020/080464

PCT Pub. Date: Apr. 23, 2020

(65) Prior Publication Data

US 2021/0351027 A1 Nov. 11, 2021

(30) Foreign Application Priority Data

Oct. 18, 2018 (CN) ........................ 201811212474.7

(51) Int. Cl.
*H01J 49/16* (2006.01)
*H01J 49/04* (2006.01)
*H01J 49/26* (2006.01)

(52) U.S. Cl.
CPC ............. *H01J 49/16* (2013.01); *H01J 49/04* (2013.01); *H01J 49/26* (2013.01)

(58) Field of Classification Search
CPC ............. H01J 49/16; H01J 49/04; H01J 49/26
See application file for complete search history.

(56) References Cited

U.S. PATENT DOCUMENTS

2011/0253889 A1* 10/2011 Ishimaru ............... H01J 49/145 250/288
2012/0199735 A1* 8/2012 Krechmer ............... H01J 49/24 250/288

FOREIGN PATENT DOCUMENTS

EP 2 562 787 A2 2/2013
EP 3 327 750 A1 5/2018

OTHER PUBLICATIONS

International Search Report for PCT/JP2019/040900 filed Jan. 8, 2020 [PCT/ISA/210].

(Continued)

*Primary Examiner* — Jill A Warden
*Assistant Examiner* — Alex Ramirez
(74) *Attorney, Agent, or Firm* — Sughrue Mion, PLLC

(57) ABSTRACT

The present invention provides dielectric barrier discharge ionization, including a dielectric barrier discharge tube and an electrode pair consisting of a first electrode and a second electrode. At least a portion of the dielectric barrier discharge tube is provided between the first electrode and the second electrode. The electrode pair can ionize the sample after the power is turned on. The dielectric barrier discharge tube is in communication with a vacuum portion. The pressure range in the dielectric barrier discharge tube is 0.01 to 100 Pa. The dielectric barrier discharge ionization provided by the invention remedies the defects of existing low-pressure ion sources in the pressure range, and provides the low-pressure ion source with high ionization ability, high versatility and simple devices.

15 Claims, 3 Drawing Sheets

(56) References Cited

OTHER PUBLICATIONS

Written Opinion for PCT/JP2019/040900 filed Jan. 8, 2020 [PCT/ISA/237].

* cited by examiner

[Fig. 1]
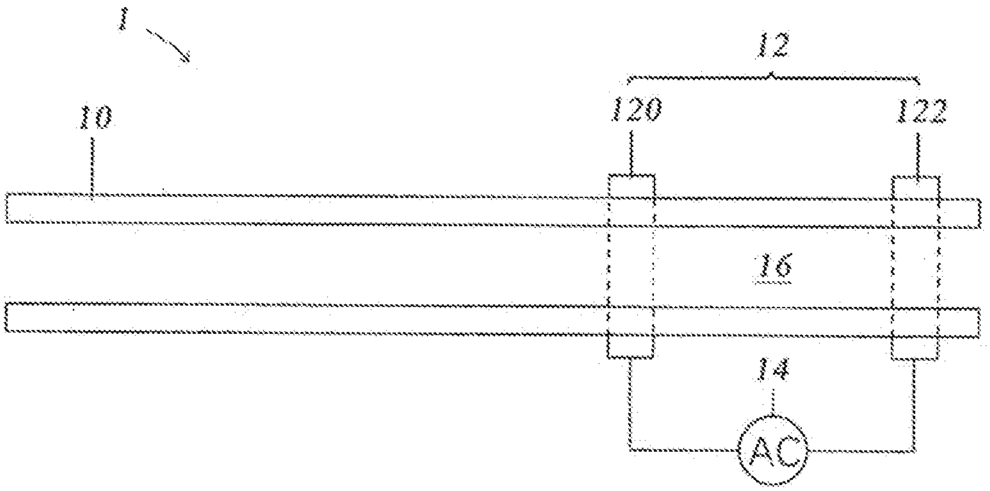
[Fig. 2]
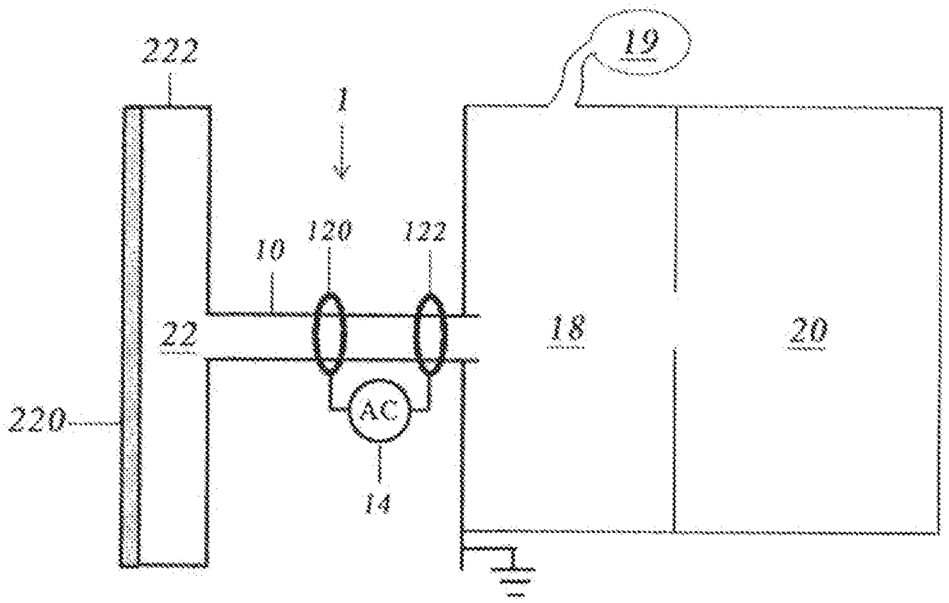

[Fig. 3]
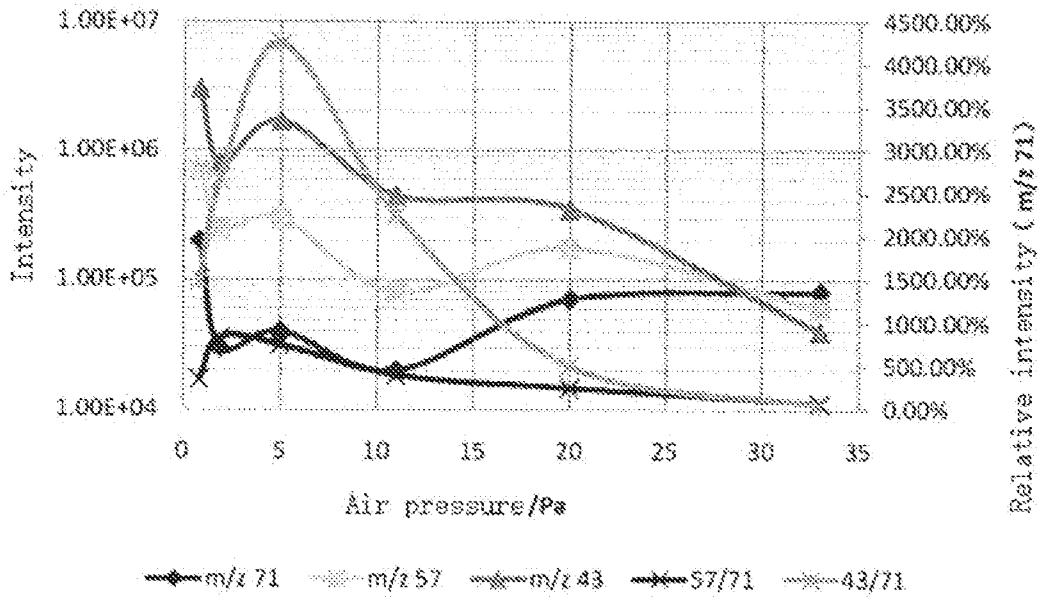
[Fig. 4]
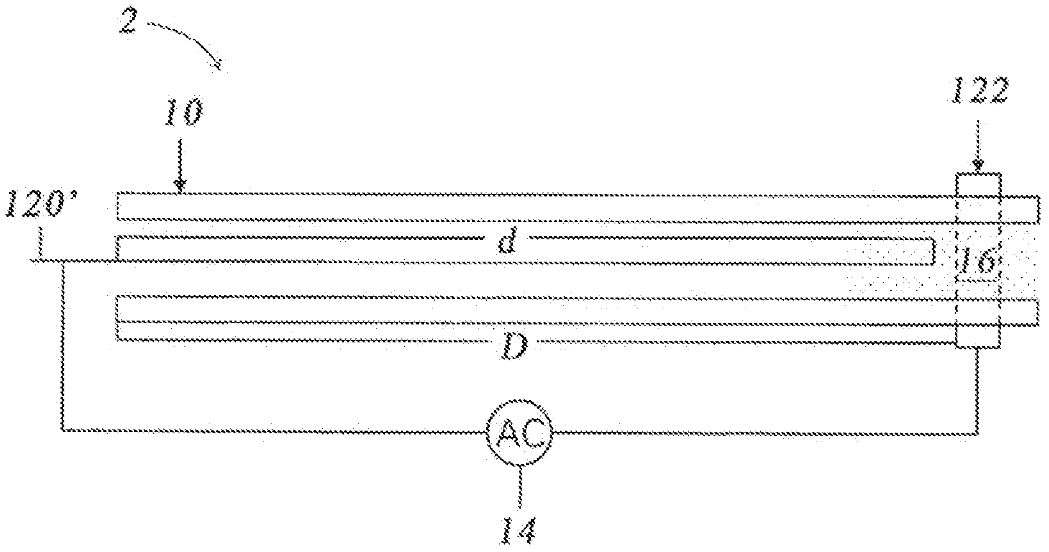

[Fig. 5]
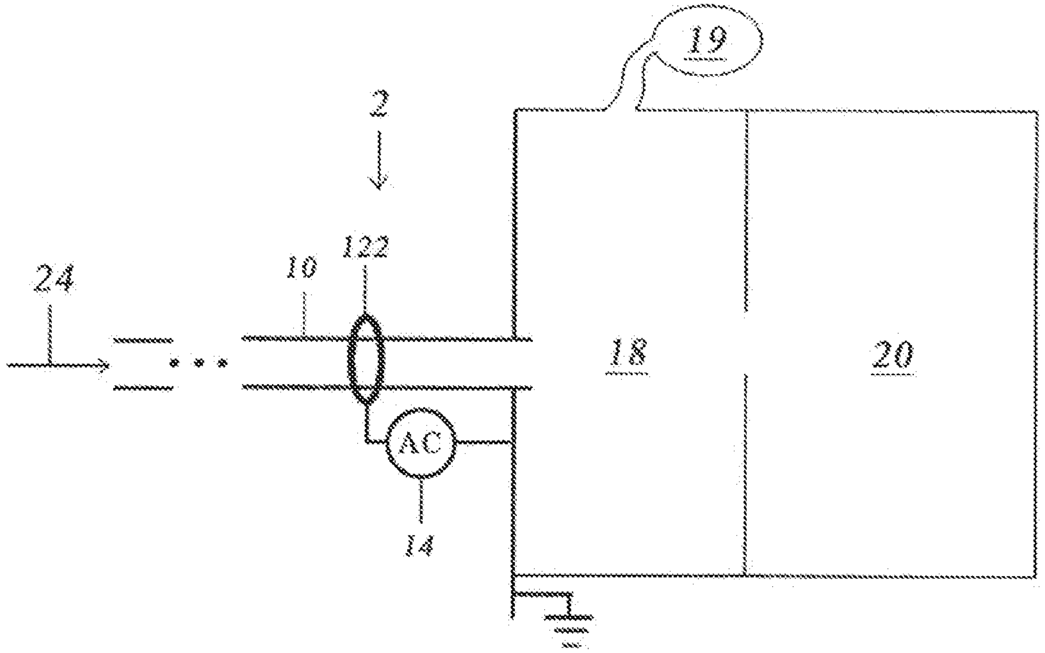
[Fig. 6]
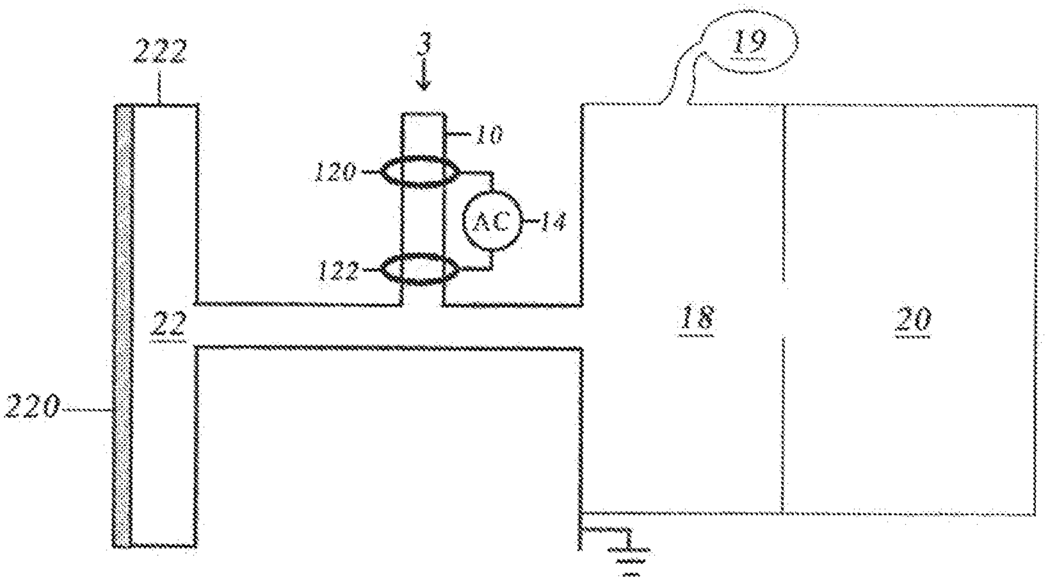

DIELECTRIC BARRIER DISCHARGE IONIZATION, ANALYTICAL INSTRUMENT AND IONIZATION METHOD

CROSS REFERENCE TO RELATED APPLICATIONS

This application is a National Stage of International Application No. PCT/JP2019/040900 filed Oct. 17, 2019, claiming priority based on Chinese Patent Application No. 201811212474.7 filed Oct. 18, 2018.

TECHNICAL FIELD

The invention relates to the field of ion analysis devices, in particular to an ion source, a mass spectrometer or an ion mobility spectrometer with the ion source, and a corresponding ionization method.

BACKGROUND ART

In mass spectrometric analysis, the atmospheric ionization technique is characterized in that the ionization of a sample molecule to be detected can be realized under open conditions, and a surface sample is directly subjected to mass spectrometric analysis. With years of developments, novel ambientionization technologies have been quite varied, and mass spectrometry analysis methods with different features have been established. In 2007, a novel atmospheric ionization technique, that is, the dielectric barrier discharge ionization (DBDI), was developed by the Zhang Xinrong Research Group of Tsinghua University.

The dielectric barrier discharge (DBD), also known as the silent discharge, is annon-equilibrium gas discharge with an insulating medium inserted into a discharge space, and the most distinguishing feature of which is being able to produce stable plasma at atmospheric pressure, thereby eliminating a vacuum device. Therefore, the dielectric barrier discharge ionization, since its appearance, has been known to those skilled in the art in the form of operating at atmospheric pressure and transmitting samples using carrier gas. For specific structures, references can be made to CN101004393A, CN101510493A, and CN102522310A.

In addition, U.S. Pat. No. 8,368,013B2 held by Hitachi discloses an ion analyzer, including an ionization chamber, a suction device, and an analysis device, wherein the ionization chamber adopts the dielectric barrier discharge ionization; one end of the dielectric barrier discharge ionization is in communication with the outside according to the invention; the air is drawn into the dielectric barrier discharge ionization; and the ionized substance is led to the sample surface and mixed with the sample so as to ionize the sample after the discharge. In the technical solution provided by the patent, the suction device can serve to perform mass transfer instead of adjusting the operating pressure of the ion source, so that a relatively high vacuum level is not required and the—pressure is normally less than 10,000 Pa. In addition, the dielectric barrier discharge tube is communicated with the outside atmosphere, and the—pressure is high. Furthermore, common dielectric barrier discharge ionization is hard to be ignited and is difficult to work at low pressure. The suction device with such a function also appears in another patent US 2013/0048851A1 disclosed by Hitachi as a reference. In the above patent, the target usage mode of the dielectric barrier discharge ionization still utilizes the characteristics of stable operation in an atmospheric and ambient environment, and the suction device is actually provided to meet the sample injection requirements thereof.

At the same time, for analytical instruments such as mass spectrometer and ion mobility spectrometer, a suitable ion source needs to be selected according to actual situations so as to meet different analysis requirements, including different operating pressures. However, currently for ion sources under low-pressure operating environment, either the suitable pressure range is narrow or an ideal ionization feature is not reached.

For example, in the operating pressure range of 0.01 to 100 Pa:

0.01-1 Pa: A typical choice in this pressure range is electron impact ion source. However, strong electron impact can produce more fragment ions and make the spectrum hard to be interpreted; and the filament is easily burnt out at an pressure above 1 Pa, which affects the lifetime of the instrument and makes the ion source impossible to be operated stably.

1-30 Pa: At present, the ion source that is able to operate stably within this range is quite deficient, and there is only photoionization ion source as is known to the inventors. However, the ionization ability of photoionization is severely limited by the maximum photon energy of the light source although the ion source is less affected by the pressure. Therefore, the photoionization is typically weak in ionization ability, and the analyte is also quite limited.

30-100 Pa: Typically, electric discharge is used to generate plasma. However, the electrode material of this type of ion source is easily consumed, the operating pressure range is narrow, and it is difficult to obtain stable discharge plasma in the pressure range of 1 to 30 Pa.

In view of the above, those skilled in the art presently have become used to take the dielectric barrier ionization as atmospheric ion source and give up developing the low-pressure applications of this type of ion source because of the characteristics that the dielectric barrier ionization can be operated stably at atmospheric pressure and requires carrier gas. Meanwhile, an ion source, which can be operated stably in various pressure ranges of low-pressure environments especially in the range of 0.01 to 100 Pa or 1 to 30 Pa with high ionization efficiency, is urgently needed to remedy the defects of existing low-pressure ion sources.

CITATION LIST

Patent Literature

PTL 1: CN101004393A
PTL 2: CN101510493A
PTL 3: CN102522310A
PTL 4: U.S. Pat. No. 8,368,013B2
PTL 5: US 2013/0048851A1

SUMMARY OF INVENTION

Solution to Problem

In view of the above problems of the prior art, the technical problem to be solved by the invention is to provide an ion source which is capable of stably operating in various pressure ranges in a low-pressure environment and has high ionization efficiency, which remedies the defects of existing low-pressure ion sources.

To solve this technical problem, the invention first provides dielectric barrier discharge ionization, including a dielectric barrier discharge tube and an electrode pair consisting of a first electrode and a second electrode. At least a portion of the dielectric barrier discharge tube is positioned between the first electrode and the second electrode. The electrode pair can ionize the sample after the power is turned on. The dielectric barrier discharge tube is in communication with a vacuum portion. The pressure range in the dielectric barrier discharge tube is 0.01 to 100 Pa.

In the process of creating the invention, the inventors overcome the technical prejudice from those skilled in the art in the past against the dielectric barrier discharge ionization, and found that the dielectric barrier discharge ionization does not need to be operated at atmospheric-pressure or slightly lower for an excellent ionization effect. With some structural adjustments, the dielectric barrier discharge ionization also can be operated at low pressures below 100 Pa or even below 30 Pa. Through further research and testing, the inventors provide a dielectric barrier discharge ionization which is capable of stably operating in various low pressure ranges and has high ionization efficiency, which remedies the defects of the versatile low-pressure ion sources.

It should be noted that the operating pressure range expressed in the form of "x-y Pa" in the invention, such as "0.01-100 Pa" and "30-100 Pa", all means a pressure range including x without including y. For example, "0.01-100 Pa" represents the pressure range including 0.01 Pa without including 100 Pa, and "30-100 Pa" represents the pressure range including 30 Pa without including 100 Pa.

In a preferred technical solution of the invention, the pressure range in the dielectric barrier discharge tube is 0.01 to 1 Pa or 1 to 30 Pa or 30 to 100 Pa. In the pressure range of 0.01 to 1 Pa, the strength of the dielectric barrier discharge ionization, compared with electron impact ion source, can be adjusted through the power of power supply. In the range of 1 to 30 Pa, the dielectric barrier discharge ionization, compared with the photoionization ion source, has higher ionization efficiency and suitable for substances that cannot be ionized by the photoionization ion source or have low ionization efficiency In the range of 30 to 100 Pa, the electrode of the dielectric barrier discharge ionization, compared with that of other plasma sources, is not easily to be consumed, and the service life is long.

In the preferred technical solution of the invention, the dielectric barrier discharge tube has an inner diameter of 0.01 to 2.5 mm and a wall thickness of less than 1.5 mm. In order to further extend the pressure range suitable for the dielectric barrier discharge ionization so as to enable the dielectric barrier discharge ionization to be stably ionized in a larger pressure range, the inventors discover in the process of creating the invention that the pressure range suitable for the dielectric barrier discharge ionization under low-pressure conditions can be greatly improved by using the dielectric barrier discharge tube with a smaller inner diameter and a smaller wall thickness. With further testing, the inventors determine the size range of the dielectric barrier discharge tube for stable operation. According to the test results, the principle of the above size limitations for adjusting the applicable pressure range is mainly based on the differences in discharge current and dielectric loss of the discharge tubes with different inner diameters and wall thicknesses. The discharge current refers to the charge through the section of the discharge tube per unit time. Once generating discharge, under the same pressure condition, the larger the section of the tube diameter, the more charge passes through the section, so that the current needed from the power supply for sustaining discharge increases, and the power consumption becomes higher. The wall thickness mainly affects the dielectric loss of the discharge tube, and the overthickness of the wall will result in a large loss of amplitude drop within a dielectric layer, which requires high voltage to cause gas breakdown.

Further, in the preferred technical solution of the invention, the inner diameter size of the dielectric barrier discharge tube is selected from any one of the following ranges: (i) 0.01-0.1 mm; (ii) 0.1-0.2 mm; (iii) 0.2-0.5 mm; (iv) 0.5-0.8 mm; (v) 0.8-1.5 mm; (vi) 1.5-2.5 mm.

Further, in the preferred technical solution of the invention, the wall thickness of the dielectric barrier discharge tube is less than 0.2 mm, or less than 0.3 mm, or less than 0.4 mm, or less than 0.5 mm, or less than 0.6 mm, or less than 0.7 mm, or less than 0.8 mm, or less than 0.9 mm, or less than 1.0 mm, or less than 1.1 mm, or less than 1.2 mm, or less than 1.3 mm, or less than 1.4 mm.

In the preferred technical solution of the invention, the first electrode is configured to extend into the dielectric barrier discharge tube, and the second electrode is configured to abut the outer wall of the dielectric barrier discharge tube. The arrangement allows that only one dielectric layer exists between the first electrode and the second electrode, thereby reducing the discharge threshold and enabling the dielectric barrier discharge ionization to operate at a lower voltage.

Further, in the preferred technical solution of the present invention, the first electrode is a needle-like electrode, and the second electrode is an annular electrode. The annular electrode can make the discharge within the tube more uniform.

Further, in the preferred technical solution of the invention, the depth of the first electrode extending into the dielectric barrier discharge tube is lower than the position where the second electrode abuts the outer wall of the dielectric barrier discharge tube.

In the preferred technical solution of the invention, the first electrode and the second electrode are provided to abut different positions of the outer wall of the dielectric barrier discharge tube respectively. By adopting the above technical solutions, the dielectric barrier discharge can uniformly occur in a partial region of the dielectric barrier discharge tube, thus improving the stability of ionization signal. In addition, for situations of limited tube diameter and wall thickness of the dielectric barrier discharge tube itself in the invention, the device itself can be prevented from moving and shaking which affect the electrode position by adopting a double peripheral electrode, thereby preventing the electrode from getting too close and influencing the ionization performance of the ion source.

Further, in the preferred technical solution of the invention, the first electrode and the second electrode are annular electrodes.

In the preferred technical solution of the invention, the frequency of alternating current applied between the first electrode and the second electrode during the ionization is 10 Hz to 10 MHz, the peak-to-peak amplitude is 100-10,000 V, and the waveform is a sine wave, a square wave, a sawtooth wave, a step wave, a triangular wave or a pulsed wave.

In the preferred technical solution of the invention, a sample inlet communicated with the dielectric barrier discharge tube is included. The sample inlet is a through hole covered by a semi-permeable membrane which can isolate air for a sample to be detected to permeate.

Further, in the preferred technical solution of the invention, the semi-permeable membrane is a PDMS semi-permeable membrane. The PDMS semi-permeable membrane can allow organic substance to enter and isolate air at the same time, which meet the vacuum requirement and the analysis requirement of the instrument well.

In the preferred technical solution of the invention, the ionized substance outlet of the dielectric barrier discharge tube is provided downstream of the sample inlet. The sample enters through the sample inlet, and mixes with and ionized by the ionized substance flowing out of the ionized substance outlet.

In the preferred technical solution of the invention, the dielectric barrier discharge tube is a quartz tube, a common glass tube, a ceramic tube, or a polymer tube. Preferably, the dielectric barrier discharge tube is a quartz tube which can be used for providing more stable discharge performance. In addition, the quartz has high hardness to tolerate certain pressure, lower cost compared with the ceramic tube, and excellent comprehensive performance.

In the preferred technical solution of the invention, the intake inlet flow of the dielectric barrier discharge ionization ranges from 0 to 100 L/min.

The invention also provides an analytical instrument with dielectric barrier discharge ionization, including a mass spectrometer, an ion mobility spectrometer or a spectrometer.

In addition, the invention further provides an ionization method, in which the dielectric barrier discharge ionization can be operated in the pressure range of 0.01 to 100 Pa to ionize the sample. Further, the preferred pressure range is (i) 0.01-30 Pa; (ii) 0.01-10 Pa; (iii) 0.01-1 Pa; (iv) 1-30 Pa; (v) 1-10 Pa; (vi) 0.01-30 Pa; (vii) 0.1-30 Pa or other suitable pressure ranges.

In the preferred technical solution of the invention, the ionization method uses the dielectric barrier discharge ionization, of which the inner diameter of the discharge tube is 0.01 to 2.5 mm and the wall thickness is less than 1.5 mm, in order to allow the dielectric barrier discharge ionization to operate stably in the above pressure ranges.

Further, in the preferred technical solution of the invention, the inner diameter size of the dielectric barrier discharge tube is selected from the following ranges: (i) 0.01-0.1 mm; (ii) 0.1-0.2 mm; (iii) 0.2-0.5 mm; (iv) 0.5-0.8 mm; (v) 0.8-1.5 mm; (vi) 1.5-2.5 mm.

Further, in the preferred technical solution of the invention, the wall thickness range of the dielectric barrier discharge tube is less than 0.2 mm, or less than 0.3 mm, or less than 0.4 mm, or less than 0.5 mm, or less than 0.6 mm, or less than 0.7 mm, or less than 0.8 mm, or less than 0.9 mm, or less than 1.0 mm, or less than 1.1 mm, or less than 1.2 mm, or less than 1.3 mm, or less than 1.4 mm.

A preferred embodiment of the invention provides a mass spectrometer which includes dielectric barrier discharge ionization and a preceding stage. The dielectric barrier discharge ionization includes:

- a dielectric barrier discharge tube, wherein the dielectric barrier discharge tube has an inner diameter of 0.01 to 2.5 mm and a wall thickness of less than 1.5 mm;
- a sample inlet communicated with the dielectric barrier discharge tube, wherein the sample inlet is a through hole covered by a semi-permeable membrane which can isolate air for the sample to be detected to permeate; the dielectric barrier discharge tube is also communicated with the preceding stage of the mass spectrometer, and the pressure range in the preceding stage and the dielectric barrier discharge tube is 0.01 to 100 Pa; and
- an electrode pair consisting of a first electrode and a second electrode, wherein at least a portion of the dielectric barrier discharge tube is provided between the first electrode and the second electrode, and the electrode pair can ionize the sample to be detected after the power is turned on.

The above mass spectrometer operates without the assistance of the carrier gas. The pressure of the ion source is controlled by using the preceding stage of the mass spectrometer. A relatively higher vacuum level can promote the semi-permeable membrane to allow the sample to permeate from the outside, and the sample injection is performed while maintaining the low-pressure environment in the dielectric barrier discharge tube. The whole device has simple and ingenious design and stable signal.

BRIEF DESCRIPTION OF DRAWINGS

FIG. 1 is a structural schematic diagram of dielectric barrier discharge ionization in a preferred embodiment of the invention;

FIG. 2 is a structural schematic diagram of a mass spectrometer in the embodiment of FIG. 1;

FIG. 3 is an intensity change chart of fragmented peaks obtained when testing an n-pentane sample by the mass spectrometer in the embodiment of FIG. 1;

FIG. 4 is a structural schematic diagram of the dielectric barrier discharge ionization in another preferred embodiment of the invention;

FIG. 5 is a structural schematic diagram of the mass spectrometer in the embodiment of FIG. 4; and FIG. 6 is a structural schematic diagram of the mass spectrometer in other preferred embodiments of the invention.

DESCRIPTION OF EMBODIMENTS

The preferred embodiments of the invention will be largely described with reference to the attached drawings as follows. In addition, the embodiments of the invention are not limited to the embodiments below, and various embodiments within the scope of the technical idea of the invention can be adopted.

Furthermore, the terms used below for spatial relationship, such as under, below, lower, over, and above, are used to describe the relationship of one element or component with another element or component as shown in the drawings. It should be understood that the terms for spatial relationship will include different orientations of the device in use or operation in addition to the orientations shown in the drawings. For example, if a device shown in the drawing is turned over, elements described as "under" or "below" other elements or components will be oriented as "above" or "over" other elements or components. Therefore, the exemplary term "below" includes the orientations of the above and the below in actual use. Of course, the device can be positioned in other ways (rotate by 90 degrees or at other orientations), and be explained accordingly through the spatial relationship descriptions used herein.

First Embodiment

As shown in FIG. 1, the first embodiment provides dielectric barrier discharge ionization 1. A dielectric barrier discharge tube 10 used by the dielectric barrier discharge ionization is a capillary tube. A pair of annular electrodes 12 (including a first electrode 120 and a second electrode 122) respectively wrap the surface of the outer wall at different positions along the axial direction of the capillary tube, and is arranged coaxially with the dielectric barrier discharge tube 10. An alternating current of 0.2 to 3 MHz can be powered on between the first electrode 120 and the second electrode 122 of the annular electrode 12. The waveform of the alternating current can be a sine wave, a square wave, a sawtooth wave, a step wave, a triangular wave, a pulsed wave or other suitable waveforms. The peak-to-peak amplitude is 100 to 10,000 V. In the present embodiment, the alternating current between the annular electrodes 12 adopts a sinusoidal waveform alternating current of 2.5 MHz with a peak-to-peak amplitude of 5,000 V, in which the alternating current is provided by an alternating current source 14 electrically connected to the first electrode 120 and the second electrode 122 respectively. With the adoption of the double annular electrode, the dielectric barrier discharge can uniformly occur in an ionization region of the dielectric barrier discharge tube 10, and the sample ions are generated continuously and stably. Meanwhile, the adoption of the double annular electrode avoids the radial deflection of the needle-like electrode due to physical vibrations which lead to the interference in the ionization performance.

In response to the alternating current between the annular electrodes 12, the dielectric barrier discharge ionization can ionize the internal gas thereof. Plasma 16 is formed first, and then if a vapor sample exists inside, the plasma 16 will mix with and ionize the vapor sample.

Currently, the dielectric barrier discharge ionization is typically used in atmospheric-pressure or slightly below atmospheric pressure. In addition to the technical prejudice formed for a long time, the main reason is that all traditional dielectric barrier discharge ionization devices need carrier gas flow to deliver the sample into the tube for reacting with the plasma, or to lead the in-tube plasma 16 out of the tube to react with the sample. Limited by the mass transfer means in the prior art, including the mass transfer with the carrier gas or a suction device, the devices thereof are hard to reach a higher vacuum level, and even harder to perform ionization at the high vacuum level.

In view of the above problems, the present embodiment provides a mass spectrometer capable of meeting the high vacuum operating conditions while performing the mass transfer stably. Referring to FIG. 2, a mass spectrometer without the assistance of the carrier gas is shown. The mass spectrometer adopts the dielectric barrier discharge ionization 1 as shown in FIG. 1 in the present embodiment. One end of the dielectric barrier discharge tube 10 of the dielectric barrier discharge ionization 1 is communicated with the sample inlet 22, and the other end is communicated with the preceding stage 18 of the mass spectrometer.

The sample inlet 22 includes at least a sample inlet port 222 for slowly introducing the sample into the dielectric barrier discharge tube 10. One end of the sample inlet port 222 is communicated with the dielectric barrier discharge tube 10, and the other end is covered by a semi-permeable membrane 220 which can isolate air, thereby ensuring that the dielectric barrier discharge tube 10 communicated with the sample inlet port 222 can be maintained at a higher vacuum level. Meanwhile, the sample that needs to be analyzed can be selectively allowed to enter the dielectric barrier discharge tube 10 in a diffused or penetrating form by adjusting the material of the semi-permeable membrane 220.

In this embodiment, the analyte is a small molecule organic substance, thereby choosing a PDMS semi-permeable membrane capable of passing the small molecule organic substance. Certainly, in other embodiments of the invention, the semi-permeable membrane of other suitable materials can also be reasonably selected according to the types of analyte so as to adjust according to actual situations. Preferably, the semi-permeable membrane 220 is removably mounted to the end of the sample inlet port 222 for convenient replacement according to actual situations.

The outlet of the dielectric barrier discharge tube 10, that is, the right end, is in communication with the preceding stage 18 of the mass spectrometer. The preceding stage 18 of the mass spectrometer is in communication with a vacuum pump 19 which can control the vacuum level of the preceding stage 18 and further control the vacuum level of the dielectric barrier discharge tube 10 communicated with the preceding stage 18. In this embodiment, since the sample inlet 22 at one end performs sample injection using the semi-permeable membrane 220 without the assistance of the carrier gas, the pressure within the dielectric barrier discharge tube 10 can be stably controlled. Meanwhile, a higher vacuum level can also be reached in the dielectric barrier discharge tube 10 due to the fact that the air can be ideally isolated. In the above ways, the pressures of the preceding stage 18 and the dielectric barrier discharge tube 10 can be stably controlled to a certain specific value in the range of 0.01 to 100 Pa by the vacuum pump 19.

In the process of creating the invention, the inventors found that the planar or annular dielectric barrier discharge ionizations mainly used currently are difficult to be operated below 100 Pa, particularly below 30 Pa. However, by means of experiments, the inventors found that the adoption of the dielectric barrier discharge ionization in this embodiment can stably realize the ionization in the range of 0.01 to 100 Pa by selecting a suitable size of the dielectric barrier discharge tube 10.

Particularly, the inner diameter of the capillary tube acting as the dielectric barrier discharge tube 10 is selected from the range of 0.01 to 2.5 mm, and the wall thickness is chosen to be less than 1.5 mm. In the embodiment, the capillary tube is a quartz tube in which the inner diameter is 0.4 mm and the wall thickness is 0.3 mm. It is found that the dielectric barrier discharge tube 10 with the above size provided by the present embodiment not only operates normally when the pressure drops below 100 Pa, but also when the pressure continues to drop below 30 Pa, the ion source still can stably ionize the sample, and the ionization ability thereof far exceeds the photoionization ion source operating within the pressure range. In addition to the characteristic of being able to operate stably in a larger pressure range, the dielectric barrier discharge ionization provided by the embodiment also has the advantages that the structure is simple, the electrode is not easily consumed, and the carrier gas is not needed.

In addition, the experiments found that the dielectric barrier discharge ionization 1 provided by the embodiment is sensitive and adjustable in terms of the ionization strength in the pressure range of 1 to 30 Pa. FIG. 3 is an intensity change chart of different fragmented peaks obtained when testing an n-pentane sample by the mass spectrometer provided by the present embodiment, and the data is shown in Table 1. The curves marked by a diamond, a square and a triangular respectively represent the ion intensity of a parent molecular ion at the mass-to-charge ratio of 71, the ion intensity of the fragmented ions at the mass-to-charge ratio of 57 and 43 changing with the operating pressure, corresponding to the Y coordinate axis on the left side; and the curves marked by an X shape and an asterisk shape are the relative intensity of the fragmented ions at the mass-to-charge ratio of 57 and 43 relative to the parent molecular ion, corresponding to the Y coordinate axis on the right side. The operating pressure in the drawing is selected from the range of 0.87 to 33 Pa.

TABLE 1: Ion intensity-operating pressure for each ion peak of n-pentane

TABLE 1

| | m/z = 71 | m/z = 57 | m/z = 43 |
|---|---|---|---|
| 0.87 Pa | 2E+05 | 7E+05 | 3E+06 |
| 1.9 Pa | 3E+04 | 2.5E+05 | 8E+05 |
| 5 Pa | 4E+04 | 3E+05 | 1.7E+06 |
| 11 Pa | 2E+04 | 8E+04 | 4.5E+05 |
| 20 Pa | 7E+04 | 1.75E+05 | 3.5E+05 |
| 33 Pa | 8E+04 | 6E+04 | 4E+04 |

It can be seen that at a relatively higher vacuum level of about 1 Pa (0.87 Pa), the ion source has an excellent ionization ability, the signal strength of each ion including the parent molecular ion and fragmented ion is relatively high, but the proportion of fragment ion is also relatively high, and the ionization is strong. With the increase of the operating pressure, the signal strength of the parent molecular ion relatively increases, while the signal strength of the fragmented ion relatively reduces, leading to softer ionization. The dielectric barrier discharge ionization provided by the embodiment can adjust the strength thereof very sensitively in order to cope with different test scenes by adjusting the operating pressure in the range of 1 to 30 Pa. In addition, for the pressure range (1 to 30 Pa) with adjustable strength, as described in the background art, the ion source capable of stable ionization within this range is opportunely unavailable at present. Therefore, the dielectric barrier discharge ionization provided by the present embodiment compensates for the defects of the ionization ability of each existing ion source in the low-pressure environment, the comprehensive performance is excellent, and the versatility is high.

In the above ways, the mass spectrometer provided by the embodiment adopts a PDMS semi-permeable membrane 220 to perform sample injection, ionizes the sample with the dielectric barrier discharge ionization 1 operating in the low-pressure environment, and adjusts the strength of the ion source by adjusting the operating pressure, so that the ion source can be suitable for different analysis scenes. The ionization ability is not affected or less affected at the same time. In addition, the mass spectrometer can be operated without the assistance of the carrier gas. The vacuum level of the ion source is controlled by using the preceding stage of the mass spectrometer. A relatively higher vacuum level can cooperate with the semi-permeable membrane to allow the sample to permeate from the outside, and the sample injection is performed while maintaining the low-pressure environment in the dielectric barrier discharge tube. The whole device has simple and ingenious design and stable signal.

It should be noted that, although the dielectric barrier discharge tube 10 is a quartz tube in the present embodiment, those skilled in the art still can choose a suitable type of material according to actual situations. For example, when the dielectric barrier discharge tube 10 is thinner in tube wall and resistant to a higher pressure, or when the requirements for the dielectric properties of the material are high, the dielectric barrier discharge tube 10 can be made of ceramic material with excellent mechanical properties and dielectric properties.

In addition, the embodiment also provides an ionization method using the dielectric barrier discharge ionization, that is, installing a vacuum pump communicated with the dielectric barrier discharge ionization, and the ion source is used when the pressure range in the dielectric barrier discharge tube of the dielectric barrier discharge ionization is controlled within 0.01 to 100 Pa or 1 to 30 Pa by the vacuum pump. The method can continuously and stably ionize a variety of gas samples at low pressure, remedies the defects of the existing low-pressure ion sources operated in the pressure range, the adjustable operating pressure range is large, and the versatility is high.

Second Embodiment

As shown in FIG. 4, the present embodiment provides an annular dielectric barrier discharge ionization 2, including a dielectric barrier discharge tube 10, an electrode pair consisting of a first electrode 120' and a second electrode 122, in which an alternating voltage is provided between the first electrode 120' and the second electrode 122 by an alternating current source 14, and each parameter of the alternating voltage is the same as in the first embodiment. In the embodiment, the dielectric barrier discharge tube 10 is a capillary tube in which the inner diameter is 0.2 mm and the wall thickness is 0.4 mm.

In the embodiment, the first electrode 120' is a needle-like electrode with one end thereof extending into the dielectric barrier discharge tube 10, and the extending depth d is smaller than the depth D of the abutting position where the second electrode 122 abuts the dielectric barrier discharge tube 10, that is, the first electrode 120' cannot reach the abutting position of the second electrode 122, and both electrodes are axially staggered along the dielectric barrier discharge tube 10. In the above ways, the annular dielectric barrier discharge ionization only retains a single layer of dielectric layer between the first electrode 120' and the second electrode 122, so that the discharge threshold is greatly reduced, and the dielectric barrier discharge can occur at a lower voltage.

The embodiment also provides a mass spectrometer including the dielectric barrier discharge ionization 2. For the structure of the mass spectrometer, refer to FIG. 5. The analysis part of the mass spectrometer includes a preceding stage 18 and a mass analysis device 20, wherein the preceding stage 18 is connected to a vacuum pump 19 which can adjust the pressure within the preceding stage 18.

In the embodiment, one end of the dielectric barrier discharge ionization 2 is in communication with a sample inlet tube, one end is directly mounted at the sample inlet of the mass spectrometer preceding stage 18 in order to increase the pressure control ability of the preceding stage 18 to the dielectric barrier discharge tube 10.

The upstream of the sample inlet tube introduces the sample into the dielectric barrier discharge tube 10 by using an intake flow 24 containing carrier gas. The flow amount of the intake flow can be adjusted between 0 and 100 L/min according to actual situations while considering the factors like sample types, the concentration in the intake flow, and the desired signal strength. Preferably, the dielectric barrier discharge tube 10 has an extension (the part marked by " . . . " in the drawing) to increase the length of the dielectric barrier discharge tube 10, so that the sample intake process requires to pass through a longer capillary tube segment in order to stabilize the intake flow 24; and reduce the influence of the pressure at the right side of the ionization position of the dielectric barrier discharge tube 10 by the intake flow 24 in order to facilitate the pressure control of the dielectric barrier discharge tube 10 by the preceding stage 18. The second electrode 122 abuts against the outer wall of the dielectric barrier discharge tube 10 and is connected to the power wire of the alternating current source 14, the first electrode 120' (not shown) is grounded, and an alternating voltage is applied between the two electrodes in the above manner.

Third Embodiment

The present embodiment provides a mass spectrometer which is relatively similar to that in the first embodiment but have a different sample introduction structure. As shown in FIG. 6, the mass spectrometer uses a sample inlet 22 coated with a semi-permeable membrane 220. However, after the sample introduction in the embodiment, instead of directly entering the ionization region of the dielectric barrier discharge ionization 3 to mix with the plasma, the ionized substance outlet of the dielectric barrier discharge tube 10, that is, the lower port of the dielectric barrier discharge tube 10, is provided downstream of the sample inlet 22 along the sample delivery direction, so that the sample can mix with and be ionized by the ionized substance flowing out of the ionized substance outlet.

In the above manner, the mass spectrometer structure provided by the embodiment can prevent the sample from directly interacting with the electrons in the discharge plasma, which results in that the sample indirectly reacts with the metastable or ionic component in the plasma and a secondary molecule-ion reaction occurs, so that the ionization process can be softer and the generation of fragmented ions can be reduced.

Fourth to Thirteenth Embodiments

In order to further determine which size of the dielectric barrier discharge tube can achieve stable ionization in a low-pressure environment, the inventors use the device structure in the first embodiment, adjust the specific size of the dielectric barrier discharge tube, and carry out a number of experiments to gradually determine the range of value meeting the conditions.

Table 2: Statistics of size-ionization performance for dielectric barrier discharge tube

TABLE 2

| | Inner diameter/mm | Tube wall thickness/mm | Operate stably or not when less than 100 Pa? | Operate stably or not when less than 30 Pa? |
|---|---|---|---|---|
| Embodiment 4 | 0.2 | 0.4 | Yes | Yes |
| Embodiment 5 | 0.2 | 1.3 | Yes | Yes |
| Embodiment 6 | 0.2 | 1.5 | No | No |
| Embodiment 7 | 0.8 | 0.1 | Yes | Yes |
| Embodiment 8 | 0.8 | 0.8 | Yes | Yes |
| Embodiment 9 | 0.8 | 1.5 | No | No |
| Embodiment 10 | 1.0 | 0.5 | Yes | Yes |
| Embodiment 11 | 1.0 | 1.5 | No | No |
| Embodiment 12 | 1.9 | 0.5 | Yes | Yes |
| Embodiment 13 | 2.8 | 0.5 | No | No |

Referring to Table 2, the inventors test dielectric barrier discharge tubes of different inner diameters and tube wall thicknesses, and the test results show that the dielectric barrier discharge tube of a suitable size can ensure that the dielectric barrier discharge ionization operates at low pressure including less than 100 or 30 Pa.

The comparison between Embodiments 4 to 6 found that the tube wall thickness of the dielectric barrier discharge tube should be limited to a reasonable range. According to Embodiment 6, the tube wall thickness of the dielectric barrier discharge tube should be less than 1.5 mm. More preferably, the tube wall thickness of the dielectric barrier discharge tube is less than 0.2 mm, or less than 0.3 mm, or less than 0.4 mm, or less than 0.5 mm, or less than 0.6 mm, or less than 0.7 mm, or less than 0.8 mm, or less than 0.9 mm, or less than 1.0 mm, or less than 1.1 mm, or less than 1.2 mm, or less than 1.3 mm, or less than 1.4 mm. The inventors speculate that different wall thickness can lead to different dielectric loss of the dielectric barrier discharge tube. The overthickness of the wall will result in a large loss of pressure drop within a dielectric layer, which requires high voltage to cause gas breakdown.

The comparison between Embodiments 10, 12, and 13 found that the inner diameter of the dielectric barrier discharge tube should be limited to a reasonable range. According to Embodiments 12 and 13, a reasonable range of the inner diameter of a dielectric barrier discharge tube is given by speculation, and is less than 2.5 mm. Preferably, the reasonable range is 0.01 to 2.5 mm. More preferably, the inner diameter size of the dielectric barrier discharge tube is selected from the following ranges: (i) 0.01-0.1 mm; (ii) 0.1-0.2 mm; (iii) 0.2-0.5 mm; (iv) 0.5-0.8 mm; (v) 0.8-1.5 mm; (vi) 1.5-2.5 mm; (vii) 0.8-1.0 mm; (viii) 1.0-1.9 mm and any combination of multiple ranges from the above. The inventors further speculate that the changes in size of the inner diameter can lead to the change in discharge current of the dielectric barrier discharge tube. The discharge current refers to the charge through the section of the discharge tube per unit time. Once generating discharge, under the same pressure condition, the larger the section of the tube diameter, the more charge passes through the section, so that the current needed by the power supply for sustaining discharge increases, and the power consumption becomes higher, which goes against sustaining discharge.

It should be noted that although the samples in the above embodiments of the present invention mainly use gas samples such as volatile organics, explosives and drugs, the choices of the above samples are merely exemplary. Those skilled in the art can also select solid or liquid samples according to actual situations, and obtain the vapor sample, which can be analyzed by the analytical instrument provided by the invention, after phase change (or conversion) by utilizing a corresponding desorption device.

Moreover, although the analytical instruments listed in the above embodiments of the present invention are all mass spectrometers, the application scenarios of the dielectric barrier discharge ionization in the invention are not limited thereto. For example, the invention also can be applied to various analytical instruments, such as ion mobility spectrometer, spectrometer, to meet the ion source requirements of different instruments within a range of low operating pressure.

Hereto, the technical solutions of the present invention have been described in conjunction with the accompanying drawings. However, those skilled in the art that will readily appreciate that the scope of the invention is obviously not limited to these specific embodiments. Equivalent modifications and substitutions can be made for the relevant technical features by those skilled in the art without departing from the principles of the invention, and the technical solution after these modifications and substitutions are intended to fall within the scope of the invention.

The invention claimed is:

1. A dielectric barrier discharge ionization apparatus, comprising a dielectric barrier discharge tube and an electrode pair consisting of a first electrode and a second electrode, wherein at least a portion of the dielectric barrier discharge tube is provided between the first electrode and the second electrode, the electrode pair ionizing a sample after power is turned on to the electrode pair, the dielectric barrier discharge tube is in communication with a vacuum pump, and a pressure range in the dielectric barrier discharge tube is 0.01 to 100 Pa, further comprising a sample inlet communicated with the dielectric barrier discharge tube, wherein the sample inlet is a through hole covered by a semi-permeable membrane, and the semi-permeable membrane isolates air from entering the dielectric barrier discharge tube while the sample to be detected permeates the semi-permeable membrane.

2. The dielectric barrier discharge ionization apparatus according to claim 1, wherein the pressure range in the dielectric barrier discharge tube is 0.01 to 1 Pa or 1 to 30 Pa or 30 to 100 Pa.

3. The dielectric barrier discharge ionization apparatus according to claim 1, wherein the dielectric barrier discharge tube has an inner diameter of 0.01 to 2.5 mm and a wall thickness of less than 1.5 mm.

4. The dielectric barrier discharge ionization apparatus according to claim 3, wherein an inner diameter size of the dielectric barrier discharge tube is selected from any one of the following ranges: (i) 0.01-0.1 mm; (ii) 0.1-0.2 mm; (iii) 0.2-0.5 mm; (iv) 0.5-0.8 mm; (v) 0.8-1.5 mm; (vi) 1.5-2.5 mm.

5. The dielectric barrier discharge ionization apparatus according to claim 3, wherein the dielectric barrier discharge tube has a wall thickness range of less than 0.2 mm, or less than 0.3 mm, or less than 0.4 mm, or less than 0.5 mm, or less than 0.6 mm, or less than 0.7 mm, or less than 0.8 mm, or less than 0.9 mm, or less than 1.0 mm, or less than 1.1 mm, or less than 1.2 mm, or less than 1.3 mm, or less than 1.4 mm.

6. The dielectric barrier discharge ionization apparatus according to claim 1, wherein the first electrode is configured to extend into the dielectric barrier discharge tube and the second electrode is configured to abut the outer wall of the dielectric barrier discharge tube.

7. The dielectric barrier discharge ionization apparatus according to claim 6, wherein a depth of the first electrode extending into the dielectric barrier discharge tube is less than the depth of the position where the second electrode abuts the outer wall of the dielectric barrier discharge tube.

8. The dielectric barrier discharge ionization apparatus according to claim 1, wherein the first electrode and the second electrode are provided to abut different positions of the outer wall of the dielectric barrier discharge tube respectively.

9. The dielectric barrier discharge ionization apparatus according to claim 1, wherein an alternating current voltage frequency applied between the first electrode and the second electrode during ionization is 10 Hz to 10 MHZ, a peak-to-peak amplitude is 100 to 10,000 V, and the waveform is a sine wave, a square wave, a sawtooth wave, a step wave, a triangular wave or a pulsed wave.

10. The dielectric barrier discharge ionization apparatus according to claim 1, wherein an ionized substance outlet of the dielectric barrier discharge tube is provided downstream of the sample inlet, the sample enters through the sample inlet and mixes with and is ionized by an ionized substance flowing out of the ionized substance outlet.

11. The dielectric barrier discharge ionization apparatus according to claim 1, wherein the dielectric barrier discharge tube is a quartz tube, a common glass tube, a ceramic tube, or a polymer tube.

12. The dielectric barrier discharge ionization apparatus according to claim 1, wherein an intake inlet flow of the dielectric barrier discharge ionization ranges from 0 to 100 L/min.

13. An analytical instrument, which is a mass spectrometer or an ion mobility spectrometer or a spectrometer, the analytical instrument comprising a dielectric barrier discharge ionization apparatus according to claim 1.

14. An ionization method, comprising ionizing a sample by a dielectric barrier discharge ionization apparatus operating in a pressure range of 0.01 to 100 Pa.

15. A mass spectrometer, comprising a dielectric barrier discharge ionization apparatus and a preceding stage, wherein the dielectric barrier discharge ionization apparatus includes: a dielectric barrier discharge tube, wherein the dielectric barrier discharge tube has an inner diameter of 0.01 to 2.5 mm and a wall thickness of less than 1.5 mm; a sample inlet communicated with the dielectric barrier discharge tube, wherein the sample inlet is a through hole, the through hole is covered by a semi-permeable membrane, and the semi-permeable membrane isolates air from entering the dielectric barrier discharge tube while a sample to be detected permeates the semi-permeable membrane; wherein the dielectric barrier discharge tube is also communicated with the preceding stage of the mass spectrometer, and the pressure range in the preceding stage and the dielectric barrier discharge tube is 0.01 to 100 Pa; and an electrode pair consisting of a first electrode and a second electrode, wherein at least a portion of the dielectric barrier discharge tube is provided between the first electrode and the second electrode, and the electrode pair ionizing the sample after power is turned on to the electrode pair.

* * * * *